(12) United States Patent
Lee et al.

(10) Patent No.: US 11,254,197 B2
(45) Date of Patent: Feb. 22, 2022

(54) TOUR BUS

(71) Applicant: OK BIOTECH CO. LTD., Hsinchu (TW)

(72) Inventors: An-Yuan Lee, Hsinchu (TW); Chia-Te Lai, Hsinchu (TW)

(73) Assignee: OK BIOTECH CO. LTD., Hsinchu (TW)

( * ) Notice: Subject to any disclaimer, the term of this patent is extended or adjusted under 35 U.S.C. 154(b) by 0 days.

(21) Appl. No.: 16/999,100

(22) Filed: Aug. 21, 2020

(65) Prior Publication Data

US 2021/0061074 A1   Mar. 4, 2021

(30) Foreign Application Priority Data

Sep. 3, 2019  (TW) ................................ 108131627
Jul. 15, 2020 (TW) ................................ 109123961

(51) Int. Cl.
| | | |
|---|---|---|
| *B60J 5/04* | (2006.01) | |
| *B60R 5/00* | (2006.01) | |
| *B60N 2/24* | (2006.01) | |
| *B62D 47/02* | (2006.01) | |

(52) U.S. Cl.
CPC ........... *B60J 5/0491* (2013.01); *B60J 5/0488* (2013.01); *B60N 2/242* (2013.01); *B60R 5/003* (2013.01); *B62D 47/02* (2013.01)

(58) Field of Classification Search
CPC ........ B60J 5/0491; B60J 5/0488; B60R 5/003
USPC ............ 296/26.01, 26.08, 26.09, 26.1, 26.11
See application file for complete search history.

(56) References Cited

U.S. PATENT DOCUMENTS

| | | | | |
|---|---|---|---|---|
| 1,756,629 A | * | 4/1930 | Campbell | B25B 1/2484 |
| | | | | 248/287.1 |
| 2,254,437 A | * | 9/1941 | Marney | B62D 63/067 |
| | | | | 296/26.1 |
| 2,554,437 A | * | 5/1951 | Alexander | F01P 11/08 |
| | | | | 184/104.3 |
| 2,788,137 A | * | 4/1957 | Harkness | B60P 1/003 |
| | | | | 414/522 |
| 3,726,422 A | * | 4/1973 | Zelin | B60R 5/04 |
| | | | | 414/522 |
| 5,222,287 A | * | 6/1993 | Cooper | B60J 5/0491 |
| | | | | 29/401.1 |

(Continued)

FOREIGN PATENT DOCUMENTS

JP        01282404 A   * 11/1989

*Primary Examiner* — Hilary L Gutman
(74) *Attorney, Agent, or Firm* — WPAT, PC

(57) ABSTRACT

A tour bus includes a vehicle body, a front door, a rear door, a plurality of wheels, a luggage compartment door and a movable placing portion. The front door, the rear door and the luggage compartment door are all disposed at one lateral side of the vehicle body, with the luggage compartment door between the front door and the rear door. The wheels connected individually to a bottom of the vehicle body are used for displacing the vehicle body. The movable placing portion is foldably disposed in a storage area of the vehicle body. The movable placing portion includes a placing platform and a supportive structure. The placing platform can protrude out of the storage area of the vehicle body. The supportive structure is pivotally connected with the placing platform, and the supportive structure supports the placing platform while the placing platform is moved out of the vehicle body.

7 Claims, 12 Drawing Sheets

(56) References Cited

U.S. PATENT DOCUMENTS

| | | | | | |
|---|---|---|---|---|---|
| 5,649,731 | A | * | 7/1997 | Tognetti | B60P 1/003 296/26.09 |
| 6,065,792 | A | * | 5/2000 | Sciullo | B60P 1/003 296/26.09 |
| 6,318,781 | B1 | * | 11/2001 | McKee | B60R 9/00 296/26.09 |
| 6,464,274 | B2 | * | 10/2002 | Mink | B60P 1/003 296/26.09 |
| 6,516,983 | B2 | * | 2/2003 | Sotiroff | B60J 5/047 224/281 |
| 7,338,104 | B1 | * | 3/2008 | Bejin | B60P 1/003 224/403 |
| 8,075,239 | B2 | * | 12/2011 | Hanzel | B60R 7/08 414/470 |
| 2004/0007889 | A1 | * | 1/2004 | Hebert | B60P 1/003 296/26.09 |
| 2008/0018130 | A1 | * | 1/2008 | Kunz | B60P 3/34 296/26.01 |
| 2009/0096237 | A1 | * | 4/2009 | Gagliano | B60P 1/003 296/26.1 |

* cited by examiner

TOUR BUS

CROSS REFERENCE TO RELATED APPLICATION

This application claims the benefits of Taiwan application Serial No. 108131627, filed on Sep. 3, 2019, and Taiwan application Serial No. 109123961, filed on Jul. 15, 2020 the disclosures of which are incorporated by references herein in its entirety.

TECHNICAL FIELD

The present disclosure relates in general to a tour bus.

BACKGROUND

Featured in higher mobility and convenience, vehicles have been widely used in various fields in daily living and work areas. According to different destinations, people can select specific route for the vehicle to follow so as to help him/her to reach various work goals. Also, with social diversity, professional vehicles for specific purposes (such as blood donation cars, sprinklers, advertising cars and tour buses) have appeared to demonstrate various functions, such as merchandise exhibitions, merchandise retails, engineering operations and entertainments.

The tour bus, or called as the tourist shuttle or the sightseeing coach, is a mass transportation vehicle. In general, the tour bus is furnished with a luggage compartment located at a lateral side of the vehicle body for passengers to store temporarily their own luggage or suitcases. A typical luggage compartment usually has a compartment door and a receiving portion. The receiving portion is a space located inside the vehicle body. After a user opens the compartment door, then his/her suitcases can be orderly placed into the receiving portion. On the other hand, while in fetching the suitcases, the user needs to bow his/her body firstly, and then he/she can extend himself/herself into the receiving portion to fetch the required suitcases. It is obvious that the aforesaid fetching procedure may cause inconvenience to the user. However, if the compartment door suddenly shifts while the user bows his/herself to cross the compartment door, it would be quite possible that the user may be harmed or in jeopardy. In particular, the conventional compartment door is not convenient for senior civilians.

Besides the tour bus, some vehicles may be also equipped with a built-in accommodation room for the user to store specific objects. When the user needs to fetch any object inside the accommodation room, the foregoing situation would be met again to, also again, cause usage inconvenience.

Thus, an improved tour bus provided for resolving the aforesaid shortcomings is definitely urgent and welcome to the persons in the art.

SUMMARY

An object of the present disclosure is to provide a tour bus that includes a movable placing portion in a storage area. The movable placing portion allows a user to fetch or store his/her own luggage in a manner with a reduced risk of hitting a luggage compartment door; particularly conveniently for senior users. In addition, a supportive structure is further introduced to reinforce the placing platform while being out of the vehicle body, and also to enhance mobility of the placing platform. To meet variety of vehicle bodies, the placing platform can be manufactured separately before being assembled to the vehicle body.

In this disclosure, the tour bus includes a vehicle body, a front door, a rear door, a plurality of wheels, a luggage compartment door and a movable placing portion. The vehicle body includes a storage area. The front door disposed at one lateral side of the vehicle body can communicate spatially inside of the vehicle body with the atmosphere. The rear door disposed at the same lateral side can also communicate spatially the inside of the vehicle body with the atmosphere. The plurality of wheels furnished individually beneath to the vehicle body are used for moving the vehicle body. The luggage compartment door disposed also at the same lateral side by corresponding to the storage area and being located between the front door and the rear door can also communicate spatially the storage area of the vehicle body with the atmosphere. The movable placing portion foldably collected in the storage area includes a driving device, a pivotal member, a transmission linkage, a placing platform and a supportive structure. The driving device is connected with the transmission linkage, and the transmission linkage is further connected with the placing platform. The pivotal member connects pivotally the placing platform and the supportive structure so as to allow the supportive structure to swing about the pivotal member with respect to the placing platform. The driving device drives the transmission linkage to further displace the placing platform in a moving direction in and out around the storage area of the vehicle body. When the placing platform is within the storage area, the supportive structure is collected in the storage area at a storage position with respect to the placing platform. When the placing platform is displaced in the moving direction to expose a portion thereof out of the vehicle body, the supportive structure is swung away from the storage position with respect to the placing platform, such that the supportive structure can reach a supporting position with respect to the placing platform, and so the supportive structure can be used to support the placing platform.

In one embodiment of this disclosure, the supportive structure is pivotally turned about the pivotal member to swing with respect to the placing platform between a top surface and a bottom surface of the placing platform.

In one embodiment of this disclosure, the storage position includes a first storage position and a second storage position, the first storage position is achieved by turning the supportive structure to adhere onto a bottom surface of the placing platform, and the second storage position is achieved by turning the supportive structure to be disposed vertically on a top surface of the placing platform.

In one embodiment of this disclosure, the movable placing portion includes a support-moving member furnished to the supportive structure, and the support-moving member is used for moving the supporting structure in the moving direction while the supportive structure is at the supporting position.

In one embodiment of this disclosure, the support-moving member is collected into the storage area according to the storage position of the supportive structure.

In one embodiment of this disclosure, the movable placing portion includes a plurality of platform-moving members, and each of the plurality of the platform-moving members is connected with the bottom surface of the placing platform.

In one embodiment of this disclosure, the vehicle body includes a seat area and a driver space, the seat area is located above the storage area, the driver space is connected spatially with one side of the seat area, and the front door is disposed by corresponding to the driver space.

As stated, by providing the tour bus of this disclosure, structures inside the luggage compartment door are improved so as to make at least a portion of the movable placing portion able to be moved out of the vehicle body, and thereupon the user needn't bow his/her body deep into the receiving portion to fetch or store his/her luggage. Thus, management of the luggage would not be a problem anymore, and possible injury to the user by the luggage compartment door can be reduced. In addition, this design of the tour bus in this disclosure is also convenient for senior civilians.

Further, in this disclosure, the placing platform of the movable placing portion can be individually structured out of the vehicle body, and then installed into the vehicle body for following usage.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1A:
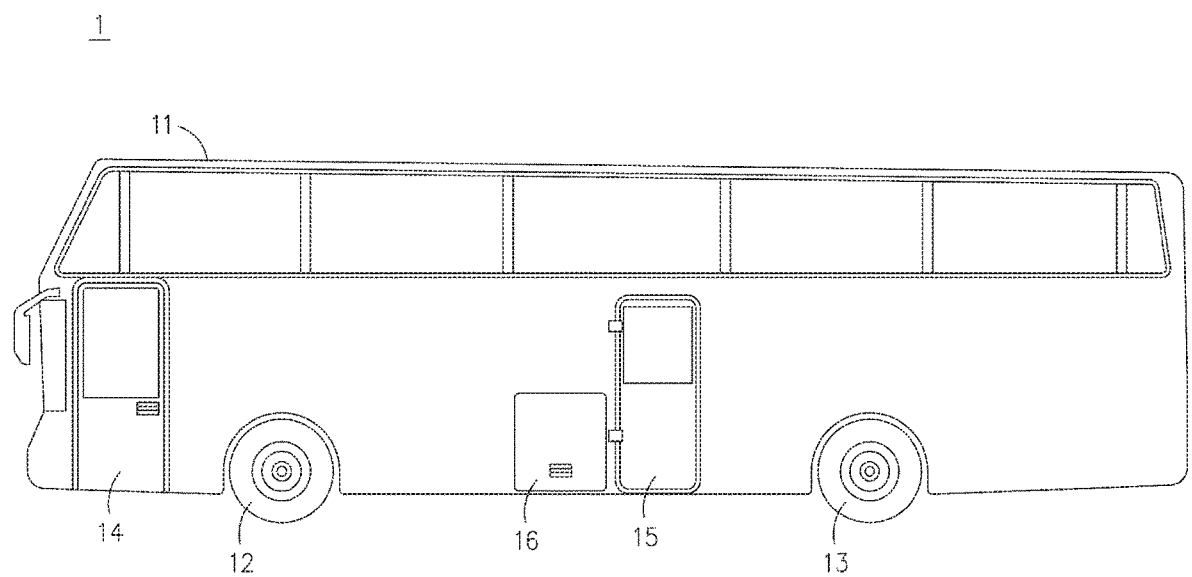
FIG. 1A is a schematic view of an embodiment of the tour bus in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
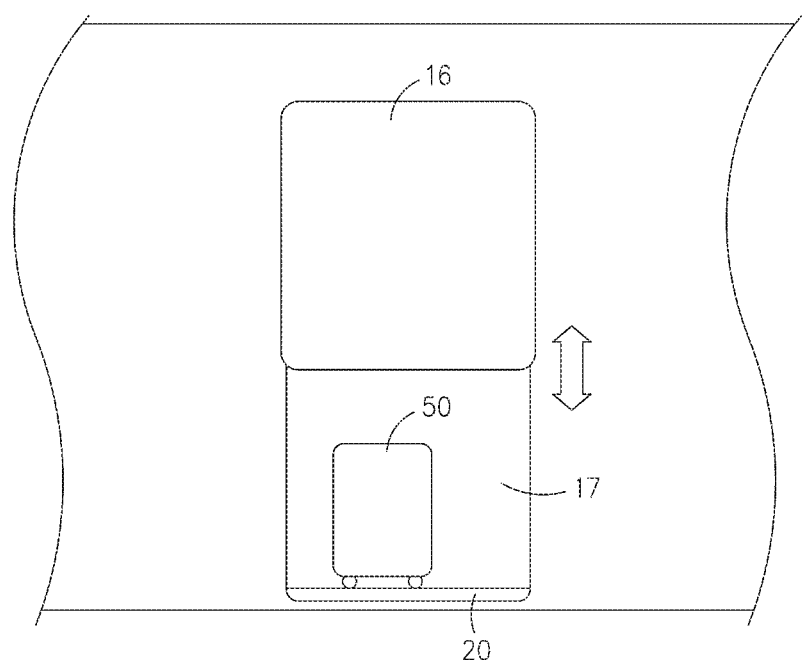
FIG. 1B is a schematic view showing an open state of the luggage compartment door of the tour bus in accordance with this disclosure.
Figure 2:
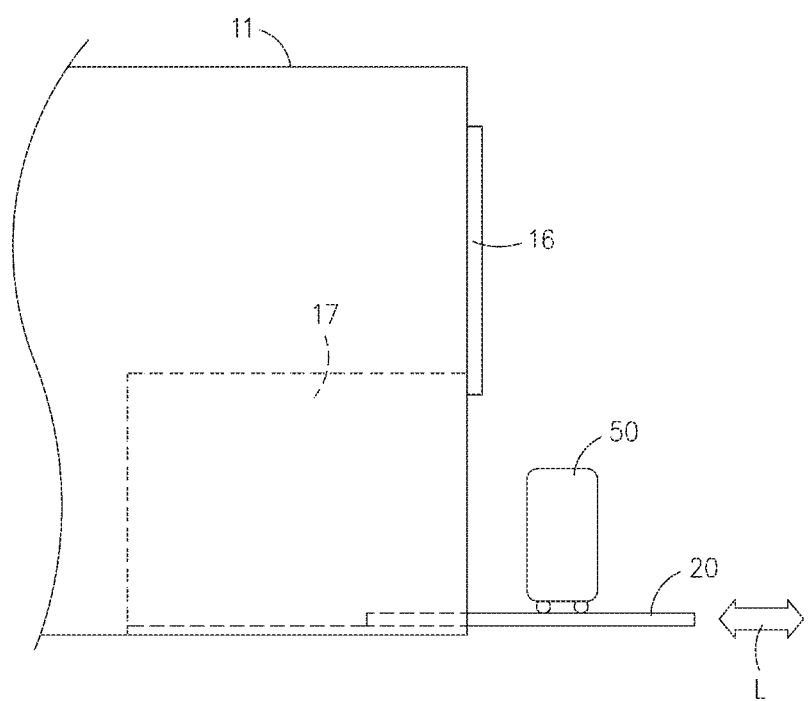
FIG. 2 is a schematic view showing that the movable placing portion of the tour bus of FIG. 1A is shifted out of the vehicle body in accordance with this disclosure.

FIG. 1A is a schematic view of an embodiment of the tour bus in accordance with this disclosure, FIG. 1B is a schematic view showing an open state of the luggage compartment door of the tour bus in accordance with this disclosure, and FIG. 2 is a schematic view showing that the movable placing portion of the tour bus of FIG. 1A is shifted out of the vehicle body in accordance with this disclosure. In this embodiment, the tour bus 1 includes a vehicle body 11, a plurality of wheels 12, 13, a front door 14, a rear door 15 and a luggage compartment door 16. The wheels 12, 13, connected to a bottom of the vehicle body 11, are used for displacing the vehicle body 11. As shown in FIG. 1A, the wheel 12 is a front wheel, and the wheel 13 is a rear wheel.

In this embodiment, the front door 14 is disposed at one lateral side of the vehicle body 11, and the rear door 15 is also disposed at the lateral side thereof. With the front door 14 or the rear door 15, a passenger can enter or leave the vehicle body 11. Inside the vehicle body 11, passenger seats, a guide seat, air-conditioning outlets, TVs, a toilet, a wireless network and charging ports are at least included. Practically, exact numbers and types of equipment or devices inside the vehicle body 11 are up to realistic requirements. The luggage compartment door 16, disposed at the lateral side of the vehicle body 11, is located between the front door 14 and the rear door 15. Behind the luggage compartment door 16, a receiving portion 17 and a movable placing portion 20 are included inside the vehicle body 11. In particular, the receiving portion 17 is a room formed inside the vehicle body 11. When the luggage compartment door 16 is opened (as shown in FIG. 2), the receiving portion 17 behind the luggage compartment door 16 would be exposed to the user. In addition, the movable placing portion 20 is movably disposed at the bottom of the receiving portion 17, so that the movable placing portion 20 can displace out of the vehicle body 11 from the receiving portion 17 in a moving direction L. Thereupon, by arranging the luggage 50 to be rested on the movable placing portion 20, the luggage 50 can be displaced out of the luggage compartment door 16 without bowing user's body deep into the receiving portion 17 while in fetching the luggage 50.

Figure 3A:
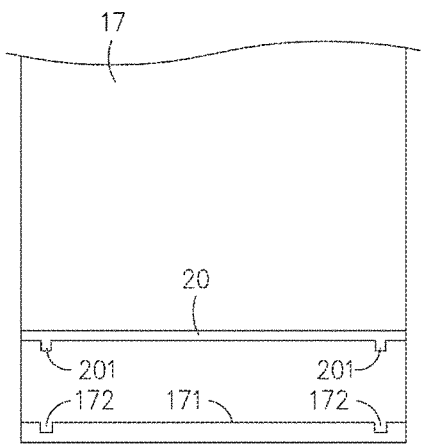
FIG. 3A and FIG. 3B demonstrate schematically an embodiment of the movable placing portion in accordance with this disclosure.
Figure 3B:
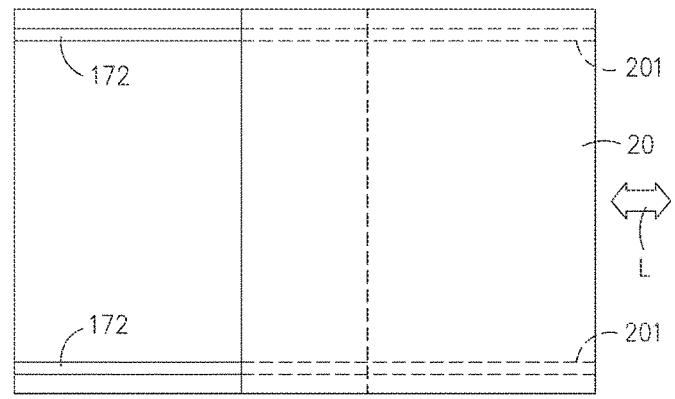

According to this disclosure, embodying of the movable placing portion 20 is not limited to the aforesaid embodiment. For example, as shown in FIG. 3A and FIG. 3B, another embodiment of the movable placing portion of the tour bus of FIG. 1A in accordance with this disclosure is schematically demonstrated. In this embodiment, a bottom 171 of the receiving portion 17 is furnished with at least one first moving member 172, and the movable placing portion 20 is furnished with at least one second moving member 201, in which the first moving member 172 is disposed in correspondence with the second moving member 201. Thereupon, by providing relative motion between the first moving member 172 and the second moving member 201, the movable placing portion 20 can be displaced. Thus, according to this embodiment, by having the second moving member 201 to move along the first moving member 172, the movable placing portion 20 can be displaced in a moving direction L on the bottom 171 of the receiving portion 17. In this embodiment, the first moving member 172 and the second moving member 21 are embodied respectively as a sliding slot and a slider to pair the sliding slot. Namely, with the slider to slide along the sliding slot, the movable placing portion 20 can displace in the moving direction L with respect to the bottom 171 of the receiving portion 17. By having FIG. 3A and FIG. 3B as an example, the first moving member 172 is a sliding slot, while the second moving member 201 is a slider. Thus, while the user pulls the movable placing portion 20 outward by displacing the slider 201 along the sliding slot 172, then a portion of the movable placing portion 20 can be moved out of the vehicle body 11 from the receiving portion 17. In an embodiment not shown herein, the first moving member is a slider, and the second moving member is a sliding slot. In other words, a bottom of the movable placing portion 20 is furnished with the sliding slot, and the bottom 171 of the receiving portion 17 is furnished the corresponding slider. Then, through the sliding slot to displace with respect to the slider, the user can pull the movable placing portion 20 to move in the aforesaid moving direction L.

Figure 4A:
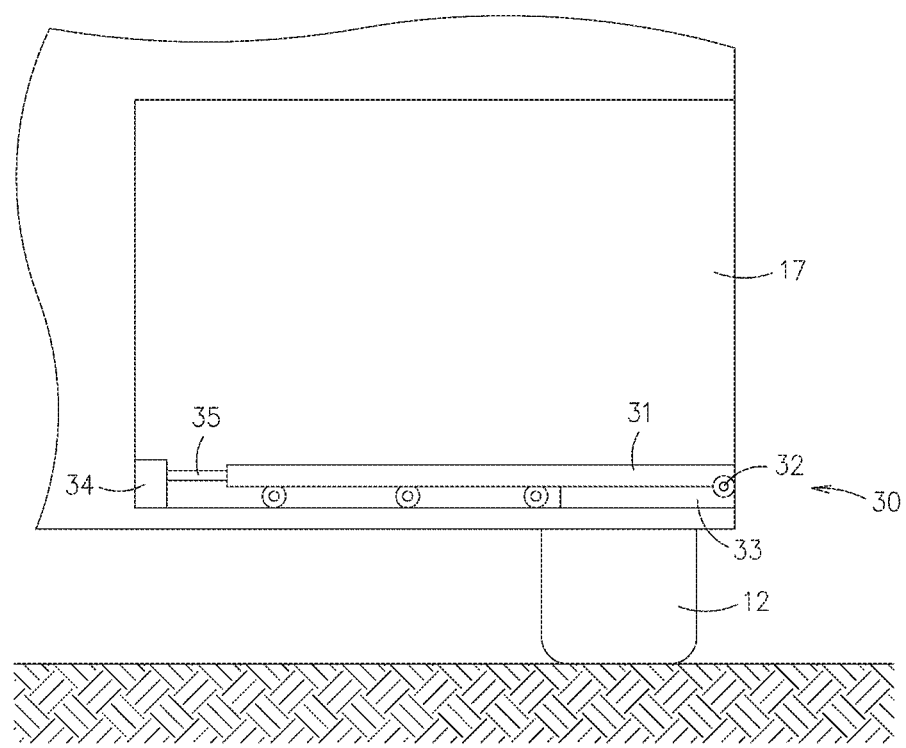
FIG. 4A and FIG. 4B demonstrate schematically another embodiment of the movable placing portion of the tour bus of FIG. 1A in accordance with this disclosure.
Figure 4B:
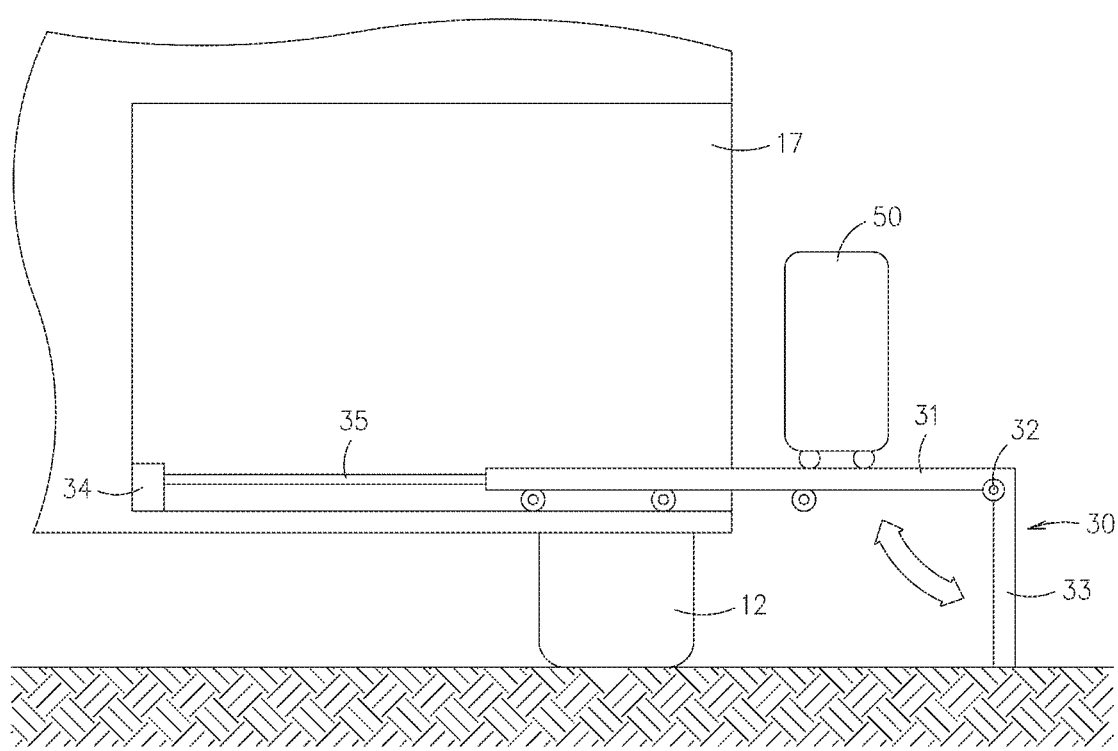

According to FIG. 4A and FIG. 4B, a further embodiment of the movable placing portion of the tour bus of FIG. 1A in accordance with this disclosure is demonstrated. It shall be explained that, for concise illustration, the aforesaid luggage compartment door 16 are omitted in FIG. 4A and FIG. 4B. The movable placing portion 30 includes a placing platform 31, a pivotal member 32, a supportive structure 33, a driving device 34 and a transmission linkage 35. The placing platform 31 is disposed inside the receiving portion 17, and the placing platform 31 is pivotally connected with the supportive structure 33 via the pivotal member 32. Namely, with the pivotal member 32, the supportive structure 33 and the placing platform 31 are pivotally connected. As shown in FIG. 4A, the supportive structure 33 can be pivotally rotated to adhere the bottom of the placing platform 31. In addition, the bottom of the placing platform 31 can be furnished with a plurality of rollers for helping the placing platform 31 to displace. The transmission linkage 35 is connected between the placing platform 31 and the driving device 34. Thereupon, the driving device 34 can drive the transmission linkage 35 to displace the placing platform 31 inside the receiving portion 17 outward so as to have a portion of the placing platform 31 out of the vehicle body 11. In this embodiment, the driving device 34 can be a driving motor, the transmission linkage 35 can be a telescopic link for displacing the placing platform 31.

As shown in FIG. 4B, while a portion of the placing platform 31 is displaced out of the vehicle body 11 so as to allow the supportive structure 33 to be completely out of the vehicle body 11, then the supportive structure 33 can be pivotally rotated, via the pivotal member 32, about the placing platform 31 to a position standing the supportive structure 33 on the ground. By having the supportive structure 33 to support the placing platform 31, weight of the luggage 50 can be safely sustained by the placing platform 31. In this embodiment, the placing platform 31 of the movable placing portion 30 can be individually structured out of the vehicle body 11, and the placing platform 31 of the movable placing portion 30 is then fixed into the vehicle body 11.

Figure 5:
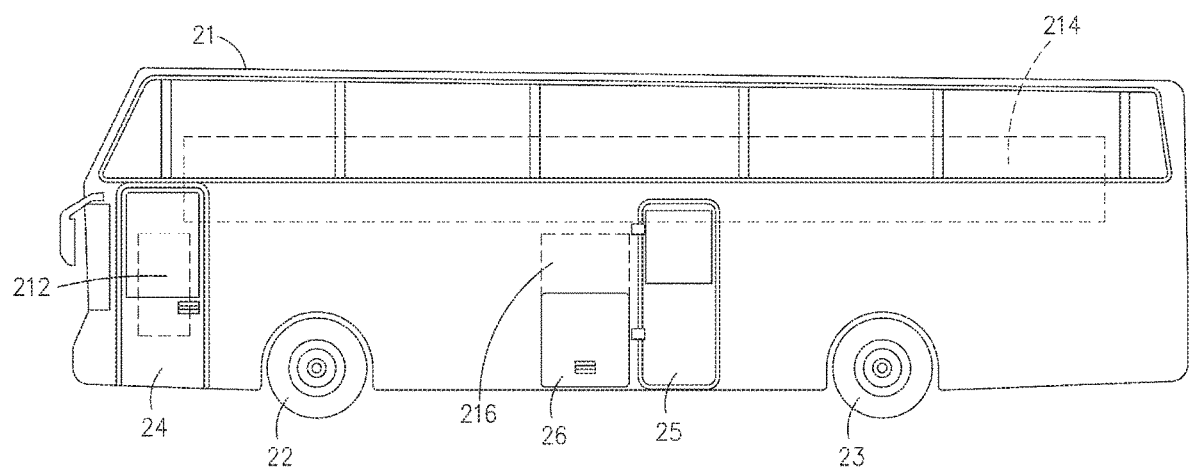
FIG. 5 is a schematic view of another embodiment of the tour bus in accordance with this disclosure.
Figure 6:
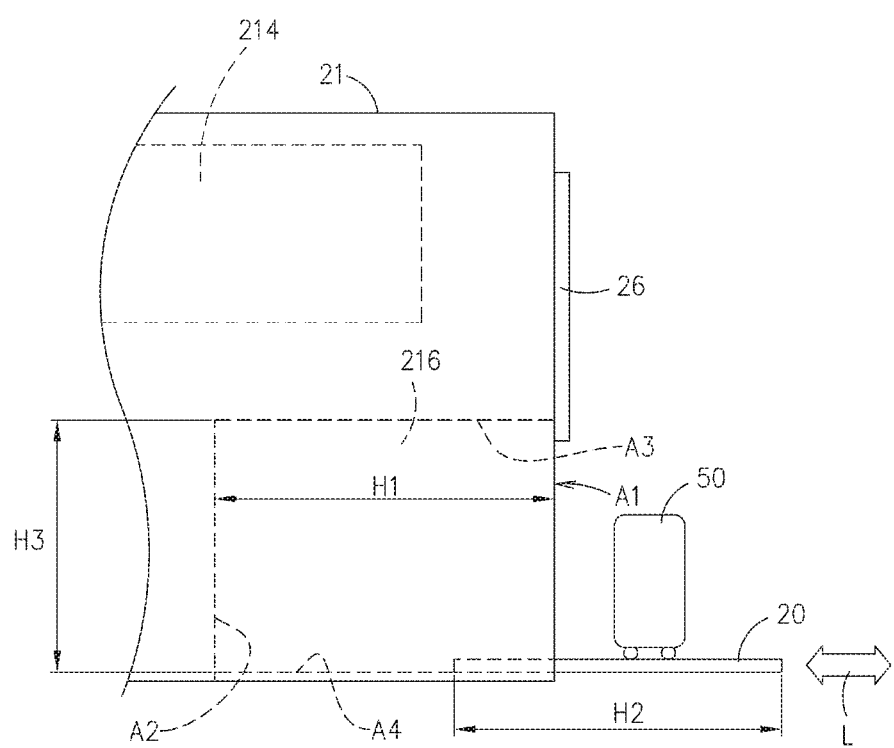
FIG. 6 is a schematic view showing that the movable placing portion of the tour bus of FIG. 5 is shifted out of the vehicle body in accordance with this disclosure.

FIG. 5 is a schematic view of another embodiment of the tour bus in accordance with this disclosure, and FIG. 6 is a schematic view showing that the movable placing portion of the tour bus of FIG. 5 is shifted out of the vehicle body. As shown, the tour bus 2 includes a vehicle body 21, a plurality of wheels 22, 23, a front door 24, a rear door 25, a luggage compartment door 26 and a movable placing portion 20. The wheels 22, 23, connected to a bottom of the vehicle body 21, are used for displacing the vehicle body 21. In this embodiment, the wheel 22 is a front wheel, and the wheel 23 is a rear wheel.

In this embodiment, the front door 24 is disposed at one lateral side of the vehicle body 21, and the rear door 25 is also disposed at the lateral side thereof. With the front door 24 or the rear door 25, a passenger can enter or leave the vehicle body 21. The vehicle body 21 includes a driver space 212, a seat area 214 and a storage area 216; in which the seat area 214 is located above the storage area 216 and the driver space 212 is connected spatially to one side of the seat area 214. The front door 24 is disposed close to the driver space 212. Both the front door 24 and the rear door 25 can communicate spatially the interior of the vehicle body 21 with the exterior thereof. Passengers can reach the seat area 214 inside the vehicle body 21 via the front door 24 or the rear door 25. In the seat area 214, passenger seats, air-conditioning outlets, TVs, a toilet, a wireless network and charging ports can be furnished. Practically, exact numbers and types of equipment or devices inside the vehicle body 21 are determined according to different requirements upon the tour bus 2.

In this embodiment, the luggage compartment door 26, disposed at the lateral side of the vehicle body 21, is located between the front door 24 and the rear door 25. The storage area 216 is an accommodation space formed inside the vehicle body 21. The location of the luggage compartment door 26 is respective to the storage area 216, and the luggage compartment door 26 is used for reaching spatially the storage area 216 inside the vehicle body 21. When the luggage compartment door 26 is opened (as shown in FIG. 6), the storage area 216 can be exposed to the user. The dimensions of the storage area 216 can be determined according to the size of the vehicle body 21. In this embodiment, the storage area 216 is an accommodation space defined by multiple walls, including lateral walls, an upper wall A3 and a lower wall A4. An opening A1 for exposing the storage area 216 is defined by edges of the lateral walls, the upper wall A3 and the lower wall A4. As shown, an inner wall A2 is defined as the rearmost lateral wall of the storage area 216. A length distance H1 is a distance of the storage area 216 in a longitudinal direction between the opening A1 and the inner wall A2, in which the longitudinal direction is parallel to the moving direction L. A height distance H3 is a distance of the storage area 216 in a vertical direction between the upper wall A3 and the lower wall A4.

In this embodiment, another length distance H2 is defined as a distance of the movable placing portion 20 in the longitudinal direction. The length distance H1 of the storage area 216 is greater than the length distance H2 of the movable placing portion 20, such that the movable placing portion 20 can be foldably disposed into the storage area 216 and moved in the moving direction L out of the storage area 216 of the vehicle body 21. When the movable placing portion 20 is moved in the moving direction L out of the vehicle body 21 from the storage area 216, the luggage 50 can be easily placed on the movable placing portion 20 or removed from the movable placing portion 20. Thus, to fetch or place the luggage 50, the user needn't anymore to bend his/her body into the storage area 216, and also the luggage compartment door 26 would be prevented from accidentally hitting the user.

In one embodiment, the movable placing portion 20 can be directly constructed into the storage area 216. However, in another embodiment, according to the specific type of the vehicle body 21, the movable placing portion 20 for the storage area 216 can be relevantly assembled outsides before being mounted into the storage area 216. It shall be explained that the movable placing portion 20 of this embodiment is not limited to a specific type. Practically, the movable placing portion 20 can be organized according to the kinematic relationship between the first moving member 172 and the second moving member 201 shown in FIG. 3A and FIG. 3B for displacing the movable placing portion 20, or according to the design shown in FIG. 4A and FIG. 4B where the supportive structure 33 is introduced to reinforce the support of the placing platform 31 outside the vehicle body and further to enhance mobility of the placing platform 31. Importantly, this disclosure is not limited to the aforesaid description. Further, in FIG. 7 to FIG. 10, other embodiments for the movable placing portion in accordance with this disclosure are provided.

Figure 7:
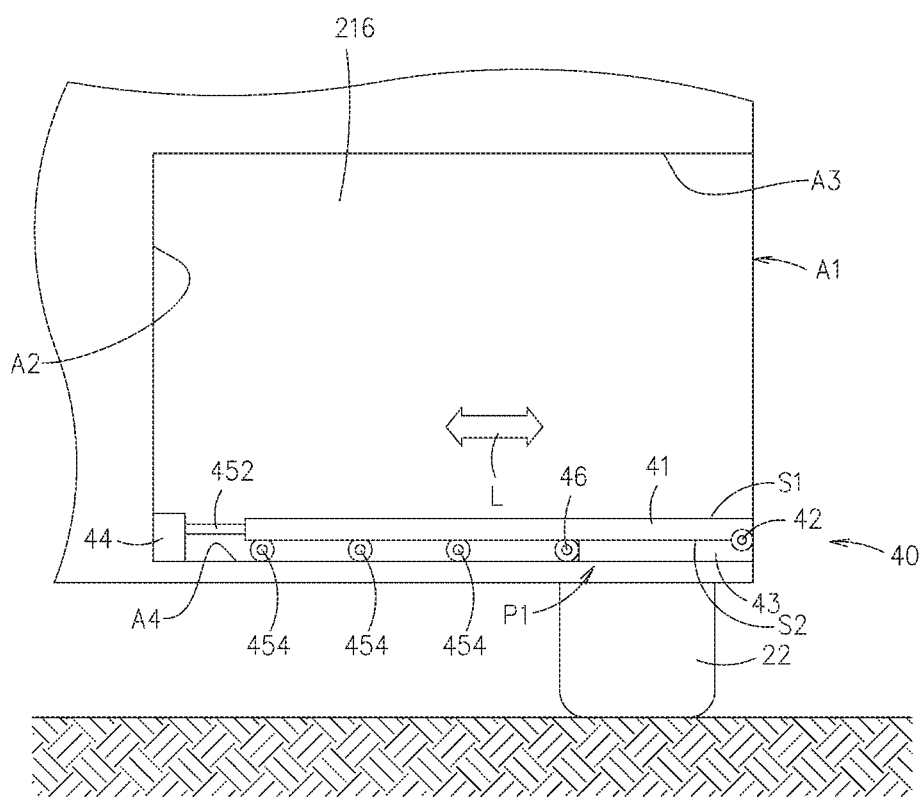
FIG. 7 and FIG. 8 demonstrate schematically another embodiment of the movable placing portion of the tour bus of FIG. 5 in accordance with this disclosure.
Figure 8:
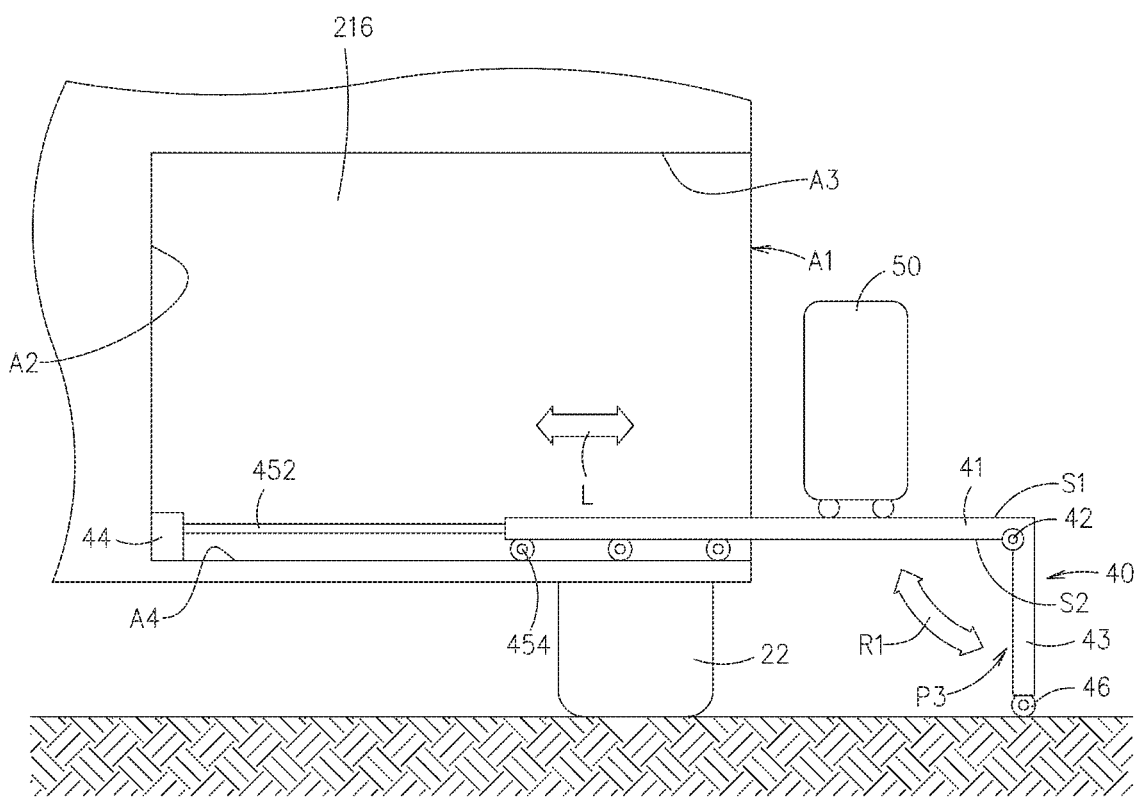

Referring now to FIG. 7 and FIG. 8, another embodiment of the movable placing portion is schematically shown. For concise explanation, the luggage compartment door 26 is omitted in both FIG. 7 and FIG. 8. In addition, the storage area 216 of FIG. 7 and FIG. 8 is similar to that of FIG. 6, thus the same components would be assigned with the same part numbers, and details thereabout would be omitted herein. As shown, the movable placing portion 40 can be disposed in the storage area 216 in a foldable manner. The movable placing portion 40 includes a placing platform 41, a pivotal member 42, a supportive structure 43, a driving device 44 and a transmission linkage 452. The placing platform 41 is disposed in the storage area 216, the pivotal member 42 connecting the placing platform 41 and the supportive structure 43 is to allow the supportive structure 43 to pivotally turn about the placing platform 41.

As shown in FIG. 7, the placing platform 41 is positioned in the storage area 216, and the supportive structure 43 is pivotally turned to a storage position under the placing platform 41 inside the storage area 216. In this state, both the supportive structure 43 and the placing platform 41 are collected in the storage area 216. In one embodiment, the supportive structure 43 is pivotally turned around the pivotal member 42 within a rotation stroke R1 for the supportive structure 43 to follow. Thereupon, the supportive structure 43 can be pivotally turned from a first storage position P1 of FIG. 7 to a supporting position P3 of FIG. 8. Namely, the supportive structure 43 is defined with a 90-degree rotation stroke R1. Practically, the storage position of the supportive structure 43 can be the first storage position P1 of FIG. 7, or the second storage position P2 of FIG. 9. The first storage position P1 of FIG. 7 can be achieved by swinging the supportive structure 43 to adhere a bottom surface S2 of the placing platform 41, and the second storage position P2 of FIG. 9 can be achieved by swinging the supportive structure 43 vertically to adhere a top surface S1 of the placing platform 41, such that the supportive structure 43 can be collected at the first storage position P1 of FIG. 7 or the second storage position P2 of FIG. 9. Thereupon, the entire collect flexibility can be increased.

In this embodiment, the driving device 44 drives the transmission linkage 452 so as to displace the placing platform 41 in the moving direction L in and out of the storage area 216 of the vehicle body 21. In FIG. 7, the placing platform 41 is located within the storage area 216. In this embodiment, the driving device 44 can be a drive motor, the transmission linkage 452 can be a telescopic connection rod to displace the placing platform 41. When the placing platform 41 is moved in the moving direction L from a position in the storage area 216 as shown in FIG. 7 to another position out of the vehicle body 21 as shown in FIG. 8, while in displacing the placing platform 41, the supportive structure 43 would be turned according to a rotation stroke R1 with respect to the placing platform 41. Namely, the supportive structure 43 is pivotally rotated about the pivotal member 42 by a 90-degree angle, such that the supportive structure 43 can stand on the floor outside the vehicle body 21 from the original position adhering the bottom surface S2 of the placing platform 41. In other words, by having the supportive structure 43 to swing with respect to the placing platform 41, the supportive structure 43 can be moved away from the first storage position P1 of the storage position so as to reach the supporting position P3 of the supportive structure 43 with respect to the placing platform 41. The luggage 50 is to be placed on the top surface S1 of the placing platform 41, and to be supported by having the supportive structure 43 to contact at the bottom surface S2 of the placing platform 41, such that the weight of the luggage 50 can be safely sustained on the placing platform 41. On the other hand, in collecting the movable placing portion 40, the supportive structure 43 shall be moved away from the supporting position P3. In this embodiment, the supportive structure 43 is pivotally rotated about the pivotal member 42, and the supportive structure 43 would be swung toward the bottom surface S2 of the placing platform 41 with respect to the placing platform 41 in a 90-degree angle. Thereupon, the supportive structure 43 can be finally attached to the bottom surface S2 of the placing platform 41, and then the placing platform 41 would be further displaced in the moving direction L into the storage area 216; i.e., from the state of FIG. 8 to that of FIG. 7.

In a further embodiment, the aforesaid manipulation can be performed by a movable placing portion 40 including a plurality of platform-moving members 454. These platform-moving members 454 are individually connected to the bottom surface S2 of the placing platform 41, and touch the lower wall A4 of the storage area 216. When the placing platform 41 is displaced in the moving direction L back and forth in the storage area 216 or out of the vehicle body 21, the platform-moving members 454 would be moved with the placing platform 41 so as thereby to displace the placing platform 41 over the lower wall A4 of the storage area 216. In this embodiment, the platform-moving member 454 can be a roller.

In one more embodiment, the movable placing portion 40 includes a support-moving member 46 connected to an end of the supportive structure 43. Referring to FIG. 8, while at the supporting position P3, the supportive structure 43 can be moved in the moving direction L via the support-moving member 46, such that the position of the placing platform 41 outside the vehicle body 21 can be adjusted. For example, the support-moving member 46 can be moved so as to displace the placing platform 41 toward the storage area 216. On the other hand, when the placing platform 41 is moved to be collected into the storage area 216 as shown in FIG. 7, according to the first storage position P1 of the supportive structure 43, the support-moving member 46 and the supportive structure 43 would be collected together into the storage area 216. Namely, at this time, the support-moving member 46 is also adhered to the bottom surface S2 of the placing platform 41.

Figure 9:
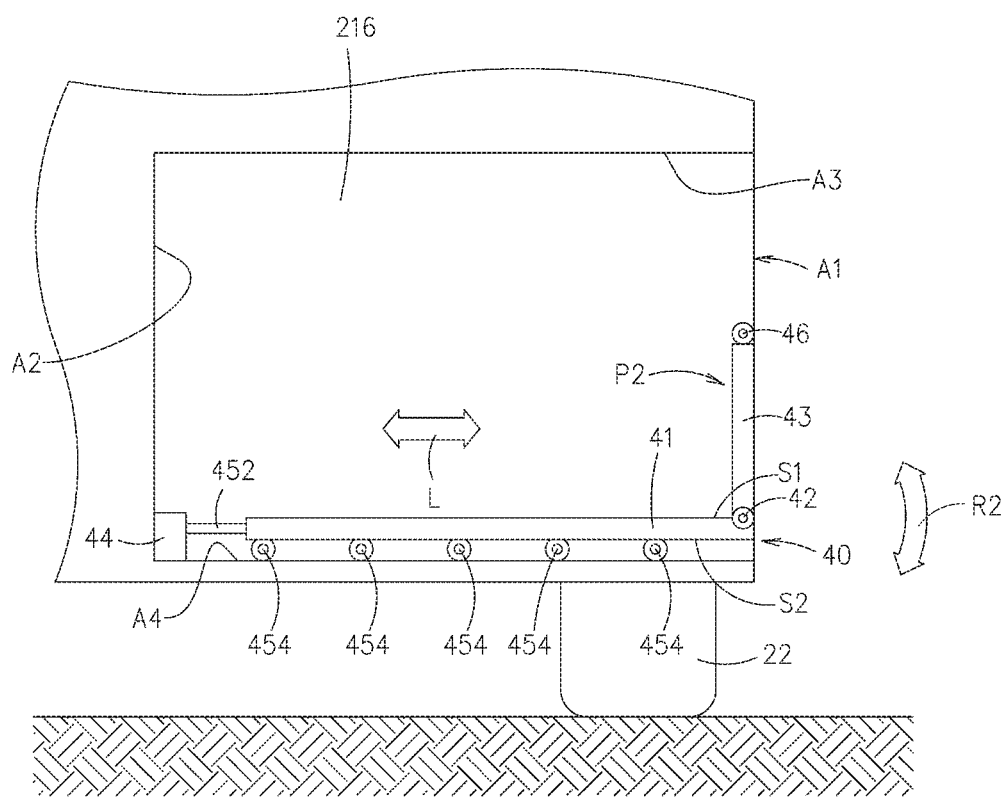
FIG. 9 and FIG. 10 demonstrate schematically a further embodiment of the movable placing portion of the tour bus of FIG. 5 in accordance with this disclosure.
Figure 10:
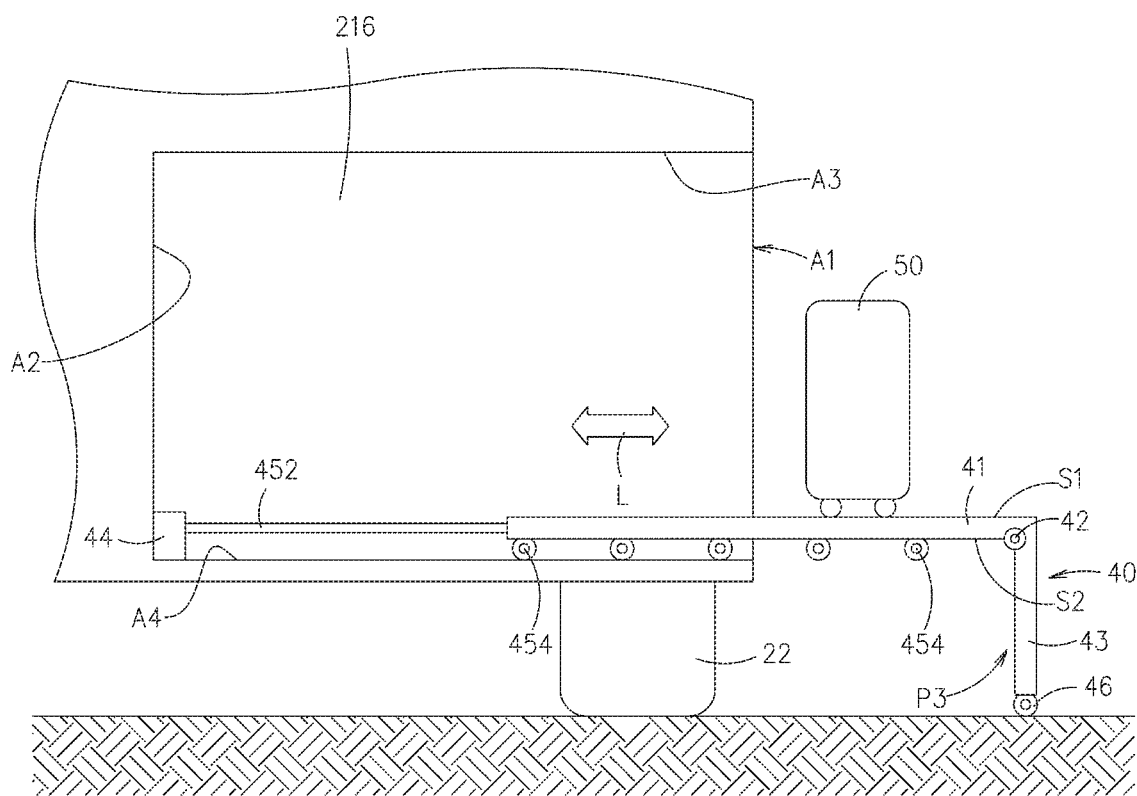

Referring to FIG. 9 and FIG. 10, one further embodiment of the movable placing portion in accordance with this disclosure is schematically shown. It shall be explained that, for concise description, since the storage area 216 in FIG. 9 and FIG. 10 is similar to that in FIG. 6, the same elements would be assigned by the same part numbers to tell the same functions, and thus details thereabout would be omitted herein. In addition, the luggage compartment door 26 is omitted in FIG. 9 and FIG. 10, and also the movable placing portion 40 in FIG. 9 and FIG. 10 is similar to that in FIG. 7 and FIG. 8. Thus, the same elements would be assigned by the same part numbers to tell the same functions, and so details thereabout would be omitted herein. In the following description, only the difference in between would be elucidated. As shown in FIG. 9, the placing platform 41 of the movable placing portion 40 is located in the storage area 216, and the supportive structure 43 thereof is turned to reach the second storage position P2 with respect to the placing platform 41, such that both supportive structure 43 and the placing platform 41 are collected in the storage area 216. As shown in FIG. 10, the supportive structure 43 is turned to reach the supporting position P3, where the supportive structure 43 is perpendicular to the top surface S1 of the placing platform 41 and stands on the floor.

In this embodiment, the driving device 44 drives the transmission linkage 452 to further displace the placing platform 41 in the moving direction L, such that the placing platform 41 can move in and out of the storage area 216 of the vehicle body 21. In the state of FIG. 9, the placing platform 41 is located in the storage area 216. When the placing platform 41 is displaced in the moving direction L from the position inside the storage area 216 as shown in FIG. 9 to another position with part of the placing platform 41 to protrude out of the storage area 216 (also, out of the vehicle body 21) as shown in FIG. 10, the supportive structure 43 would be turned 180° about the pivotal member 42, simultaneously with the placing platform 41, according to the rotation stroke R2 to stand vertically on the floor (the supporting position P3) from the second storage position P2. As described above, the supportive structure 43 is moved away from the second storage position P2 to the supporting position P3, with respect to the placing platform 41. At the supporting position P3, the supportive structure 43 supports at the bottom surface S2 of the placing platform 41, such that the weight of the luggage 50 won't crash the placing platform 41. On the other hand, in collecting the movable placing portion 40, the supportive structure 43 shall be moved away from the supporting position P3, then the supportive structure 43 is turned by pivoting about the pivotal member 42 to obtain a 180-degree rotational angle with respect to the placing platform 41, such that the supportive structure 43 can be moved vertically and fixed above the top surface S1 of the placing platform 41. In some other embodiments, the supportive structure 43 can be further adhered to the top surface S1 of the placing platform 41. Finally, the placing platform 41 is then moved in the moving direction L to enter the storage area 216 as a state shown in FIG. 9.

In the aforesaid manipulation upon the movable placing portion 40, the platform-moving members 454 can facilitate the moving of the placing platform 41.

In one more further embodiment, the movable placing portion 40 can include a support-moving member 46 furnished to the free end of the supportive structure 43. When the supportive structure 43 is at the supporting position P3 as shown in FIG. 10, the support-moving member 46 can be used for displacing the supportive structure 43 in the moving direction L, such that the placing platform 41 can be conveniently moved while being protruded out of the vehicle body 21. On the o the hand, when the placing platform 41 is moved to be collected into the storage area 216 as shown in FIG. 9, then the supportive structure 43 as well as the support-moving member 46 can be collected in the storage area 216 at the second storage position P2 as shown in FIG. 9.

In summary, by providing the tour bus of this disclosure, structures inside the luggage compartment door are improved so as to make at least a portion of the movable placing portion able to be moved out of the vehicle body, and thereupon the user needn't bow his/her body deep into the receiving portion to fetch or store his/her luggage. Thus, management of the luggage would not be a problem anymore, and possible injury to the user by the luggage compartment door can be reduced. In addition, this design of the tour bus in this disclosure is also convenient for senior civilians.

Further, in this disclosure, the placing platform of the movable placing portion can be individually structured out of the vehicle body, and then installed into the vehicle body for following usage.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A tour bus, comprising:
a vehicle body, including a storage area;
a front door, disposed at a lateral side of the vehicle body, being to communicate spatially an inside of the vehicle body with the atmosphere;
a rear door, disposed at the lateral side of the vehicle body, being to communicate spatially the inside of the vehicle with the atmosphere;
a plurality of wheels, furnished under the vehicle body for moving the vehicle body;
a luggage compartment door, dispose at the lateral side of the vehicle body at a place respective to the storage area, located between the front door and the rear door, being to communicate spatially the storage area with the atmosphere;
a movable placing portion, foldably disposed in the storage area, including a driving device, a pivotal member, a transmission linkage, a placing platform and a supportive structure, the driving device being connected with the transmission linkage, the transmission linkage being further connected with the placing platform, the pivotal member being connected between the placing platform and the supportive structure for pivotally connecting the supportive structure and the placing platform, the driving device driving the transmission linkage to further displace the placing platform in a moving direction back and forth in the storage area and the atmosphere out of the vehicle body; and
a plurality of rotatable members connected to the movable placing portion and supported by a lower wall of the storage area to carry the placing platform in the moving direction and allow a partial displacement of the placing platform out of the vehicle body and over the lower wall of the storage area;
wherein, when the placing platform is located in the storage area, the supportive structure is collected at a storage position with respect to the placing platform within the storage area;
wherein, when a portion of the placing platform in the storage area is displaced to protrude out of the vehicle body in the moving direction, the supportive structure is turned away from the storage position with respect to the placing platform, and a supporting position is reached by the supportive structure with respect to the placing platform, such that the placing platform is supported by the supportive structure; and wherein the supportive structure is pivotally turned about the pivotal member to reach a first pivot angle of 90° when pivoting from a first storage position, and reach a second pivot angle of 180° when pivoting from a second storage position.

2. The tour bus of claim 1, wherein the movable placing portion includes a support-moving member furnished to the supportive structure, and the support-moving member is used for moving the supporting structure in the moving direction while the supportive structure is at the supporting position.

3. The tour bus of claim 2, wherein the support-moving member is collected into the storage area according to the storage position of the supportive structure.

4. The tour bus of claim 1, wherein the movable placing portion includes a plurality of platform-moving members, and each of the plurality of the platform-moving members is connected with the bottom surface of the placing platform.

5. The tour bus of claim 1, wherein the vehicle body includes a seat area and a driver space, the seat area is located above the storage area, the driver space is connected spatially with one side of the seat area, and the front door is disposed by corresponding to the driver space.

6. A tour bus, comprising:
a vehicle body, including a storage area;
a front door, disposed at a lateral side of the vehicle body, being to communicate spatially an inside of the vehicle body with the atmosphere;
a rear door, disposed at the lateral side of the vehicle body, being to communicate spatially the inside of the vehicle with the atmosphere;
a plurality of wheels, furnished under the vehicle body for moving the vehicle body;
a luggage compartment door, dispose at the lateral side of the vehicle body at a place respective to the storage area, located between the front door and the rear door, being to communicate spatially the storage area with the atmosphere;
a movable placing portion, foldably disposed in the storage area, including a driving device, a pivotal member, a transmission linkage, a placing platform and a supportive structure, the driving device being connected with the transmission linkage, the transmission linkage being further connected with the placing platform, the pivotal member being connected between the placing platform and the supportive structure for pivotally connecting the supportive structure and the placing platform, the driving device driving the transmission linkage to further displace the placing platform in a moving direction back and forth in the storage area and the atmosphere out of the vehicle body; and
a plurality of rotatable members connected to the movable placing portion and supported by a lower wall of the storage area to carry the placing platform in the moving direction and allow a partial displacement of the placing platform out of the vehicle body and over the lower wall of the storage area;
wherein, when the placing platform is located in the storage area, the supportive structure is collected at a storage position with respect to the placing platform within the storage area;
wherein, when a portion of the placing platform in the storage area is displaced to protrude out of the vehicle body in the moving direction, the supportive structure is turned away from the storage position with respect to the placing platform, and a supporting position is reached by the supportive structure with respect to the placing platform, such that the placing platform is supported by the supportive structure; and
wherein the storage position includes a first storage position and a second storage position, the first storage position is achieved by turning the supportive structure 90° in a first direction toward a bottom surface of the placing platform, and the second storage position is achieved by turning the supportive structure 180° in a second direction toward a top surface of the placing platform.

7. A tour bus, comprising:
a vehicle body, including a storage area;
a front door, disposed at a lateral side of the vehicle body, being to communicate spatially an inside of the vehicle body with the atmosphere;
a rear door, disposed at the lateral side of the vehicle body, being to communicate spatially the inside of the vehicle with the atmosphere;
a plurality of wheels, furnished under the vehicle body for moving the vehicle body;
a luggage compartment door, dispose at the lateral side of the vehicle body at a place respective to the storage area, located between the front door and the rear door, being to communicate spatially the storage area with the atmosphere;
a movable placing portion, foldably disposed in the storage area, including a driving device, a pivotal member, a transmission linkage, a placing platform and a supportive structure, the driving device being connected with the transmission linkage, the transmission linkage being further connected with the placing platform, the pivotal member being connected between the placing platform and the supportive structure for pivotally connecting the supportive structure and the placing platform, the driving device being to drive the transmission linkage to further displace the placing platform in a moving direction back and forth in the storage area and the atmosphere out of the vehicle body; and
a plurality of rotatable members connected to the movable placing portion and supported by a lower wall of the storage area to carry the placing platform in the moving direction and allow a partial displacement of the placing platform out of the vehicle body and over the lower wall of the storage area,
wherein, when the placing platform is located in the storage area, the supportive structure is collected at a storage position with respect to the placing platform within the storage area,
wherein the supportive structure is pivotally turned about the pivotal member to reach a pivot angle of 270° when pivoting from a first storage position to a second storage position, and
wherein, when a portion of the placing platform in the storage area is displaced to protrude out of the vehicle body in the moving direction, the supportive structure is turned away from the storage position with respect to the placing platform, and a supporting position is reached by the supportive structure with respect to the placing platform, such that the placing platform is supported by the supportive structure.

* * * * *